(12) United States Patent
Venkatasubramanian et al.

(10) Patent No.: US 11,372,775 B2
(45) Date of Patent: Jun. 28, 2022

(54) MANAGEMENT OF THE UNTRANSLATED TO TRANSLATED CODE STEERING LOGIC IN A DYNAMIC BINARY TRANSLATION BASED PROCESSOR

(71) Applicant: Intel Corporation, Santa Clara, CA (US)

(72) Inventors: Girish Venkatasubramanian, Mountain View, CA (US); Jason M. Agron, San Jose, CA (US); Cristiano Pereira, Groveland, CA (US); Rangeen Basu Roy Chowdhury, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 16/777,063

(22) Filed: Jan. 30, 2020

(65) Prior Publication Data

US 2020/0174944 A1 Jun. 4, 2020

Related U.S. Application Data

(63) Continuation of application No. 15/823,387, filed on Nov. 27, 2017, now abandoned.

(51) Int. Cl.
*G06F 12/10* (2016.01)
*G06F 12/12* (2016.01)
(Continued)

(52) U.S. Cl.
CPC ............ *G06F 12/1027* (2013.01); *G06F 8/00* (2013.01); *G06F 9/325* (2013.01); *G06F 9/3836* (2013.01);
(Continued)

(58) Field of Classification Search
CPC ...... G06F 12/1027; G06F 12/10; G06F 9/325; G06F 12/0831; G06F 12/1009; G06F 12/12; G06F 9/3836
(Continued)

(56) References Cited

U.S. PATENT DOCUMENTS 9,262,336 B2   2/2016   Hyuseinova et al.
10,353,680 B2  7/2019   Abdallah
(Continued)

OTHER PUBLICATIONS

T. Ukezono and K. Tanaka, "Dynamic binary code translation for data prefetch optimization," 2008 13th Asia-Pacific Computer Systems Architecture Conference, 2008, pp. 1-8.*
(Continued)

*Primary Examiner* — Pierre Michel Bataille
(74) *Attorney, Agent, or Firm* — Nicholson De Vos Webster & Elliott LLP

(57) ABSTRACT

A processor comprising an instruction execution circuit to execute a second code stored at a second address of a memory, wherein the second code is translated from a first code stored at a first address of the memory and a translation table (TT) controller coupled to a translation table to store a TT entry comprising a mapping between the first address and the second address and an attribute field comprising an attribute value associated with execution of the second code, wherein the TT controller is to monitor execution of the second code by the instruction execution circuit and update, based on a performance metric of the execution, the attribute value of the TT entry.

18 Claims, 12 Drawing Sheets

(51) Int. Cl.
| | |
|---|---|
| *G06F 12/1027* | (2016.01) |
| *G06F 12/1009* | (2016.01) |
| *G06F 9/32* | (2018.01) |
| *G06F 12/0831* | (2016.01) |
| *G06F 9/38* | (2018.01) |
| *G06F 8/00* | (2018.01) |
| *G06F 12/02* | (2006.01) |

(52) U.S. Cl.
CPC ...... *G06F 12/0292* (2013.01); *G06F 12/0831* (2013.01); *G06F 12/1009* (2013.01); *G06F 12/12* (2013.01); *G06F 2212/68* (2013.01)

(58) Field of Classification Search
USPC .................................................. 711/202, 206
See application file for complete search history.

(56) References Cited

U.S. PATENT DOCUMENTS

| | | | |
|---|---|---|---|
| 10,459,852 B1* | 10/2019 | Michaud | G06F 13/161 |
| 10,489,306 B2* | 11/2019 | Bolbenes | G06F 12/126 |
| 2001/0042172 A1 | 11/2001 | Duesterwald et al. | |
| 2002/0147970 A1 | 10/2002 | Smith et al. | |
| 2004/0186946 A1 | 9/2004 | Lee | |
| 2005/0086650 A1 | 4/2005 | Yates et al. | |
| 2008/0189506 A1 | 8/2008 | Kopec et al. | |
| 2009/0150335 A1 | 6/2009 | Latorre | |
| 2010/0106479 A1 | 4/2010 | Hieda | |
| 2010/0161875 A1 | 6/2010 | Chang et al. | |
| 2012/0159193 A1* | 6/2012 | Spradlin | G06F 21/51 |
| | | | 713/190 |
| 2014/0245273 A1* | 8/2014 | Raikin | G06F 8/52 |
| | | | 717/151 |
| 2014/0258622 A1 | 9/2014 | Lacourba et al. | |
| 2014/0281352 A1 | 9/2014 | Venkatsubramanian et al. | |
| 2014/0379955 A1 | 12/2014 | Dong et al. | |
| 2015/0058594 A1 | 2/2015 | King et al. | |
| 2015/0301841 A1 | 10/2015 | Mackintosh et al. | |
| 2016/0055088 A1 | 2/2016 | Zhang et al. | |
| 2016/0283234 A1 | 9/2016 | Xekalakis et al. | |
| 2017/0083339 A1 | 3/2017 | Burger et al. | |
| 2017/0220477 A1* | 8/2017 | Wang | G06F 11/3409 |
| 2018/0004675 A1 | 1/2018 | Shanbhogue et al. | |
| 2018/0285283 A1 | 10/2018 | Caprioli et al. | |

OTHER PUBLICATIONS

Non-Final Office Action, U.S. Appl. No. 15/823,387, dated Feb. 26, 2019, 13 pages.
Non-Final Office Action, U.S. Appl. No. 15/823,387, dated Jun. 25, 2019, 9 pages.
Notice of Allowance, U.S. Appl. No. 15/823,387, dated Oct. 30, 2019, 9 pages.
Elisavet Kozyri, "CS4410: Operating Systems—Memory Paging", Jul. 21, 2016, Cornell University, Summer 2016, 1-21, http://www.cs.cornell.edu/courses/cs4410/2016su/slides/lecture11.pdf (Year: 2016).
"Translation Lookaside Buffer", Nov. 2, 2016, Wikipedia, revision from Nov. 2, 2016, pp. 1-11, https://en.wikipedia.org/w/index.php?title=Translation_lookaside_buffer&oldid=747504156 (Year: 2016).

* cited by examiner

200

Mapping 202

| Un-translated Code Address 206 | Translated Code Address 208 |
|---|---|
| 0xABCD | 0xWXYZABCD |

Attributes 204

| Hit Count 210 | Loop 220 | Dynamic Execution Count 222 | Gear 224 | Prefetch 226 | LRU 228 |
|---|---|---|---|---|---|
| 15 | 0 | 8 | 2 | 0 | 0 |

Monitor execution of a second code translated from a first code 402

Update, based on a performance metric of the execution, an attribute value of the TT entry 404

US 11,372,775 B2

MANAGEMENT OF THE UNTRANSLATED TO TRANSLATED CODE STEERING LOGIC IN A DYNAMIC BINARY TRANSLATION BASED PROCESSOR

RELATED APPLICATIONS

This application is a continuation of U.S. patent application Ser. No. 15/823,387, filed Nov. 27, 2017, which is hereby incorporated by reference in its entirety.

TECHNICAL FIELD

Embodiments of the disclosure relate generally to microprocessors and more specifically, but without limitation, to a dynamic binary translation (DBT) based microprocessor.

BACKGROUND

Multi-core processors are found in most computing systems today, including servers, desktops and a System on a Chip (SoC). Computer systems that utilize these multi-core processors may execute instructions of various types of code.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates an entry of an extended translation table according to an embodiment of the present disclosure.

DETAILED DESCRIPTION

Figure 1:
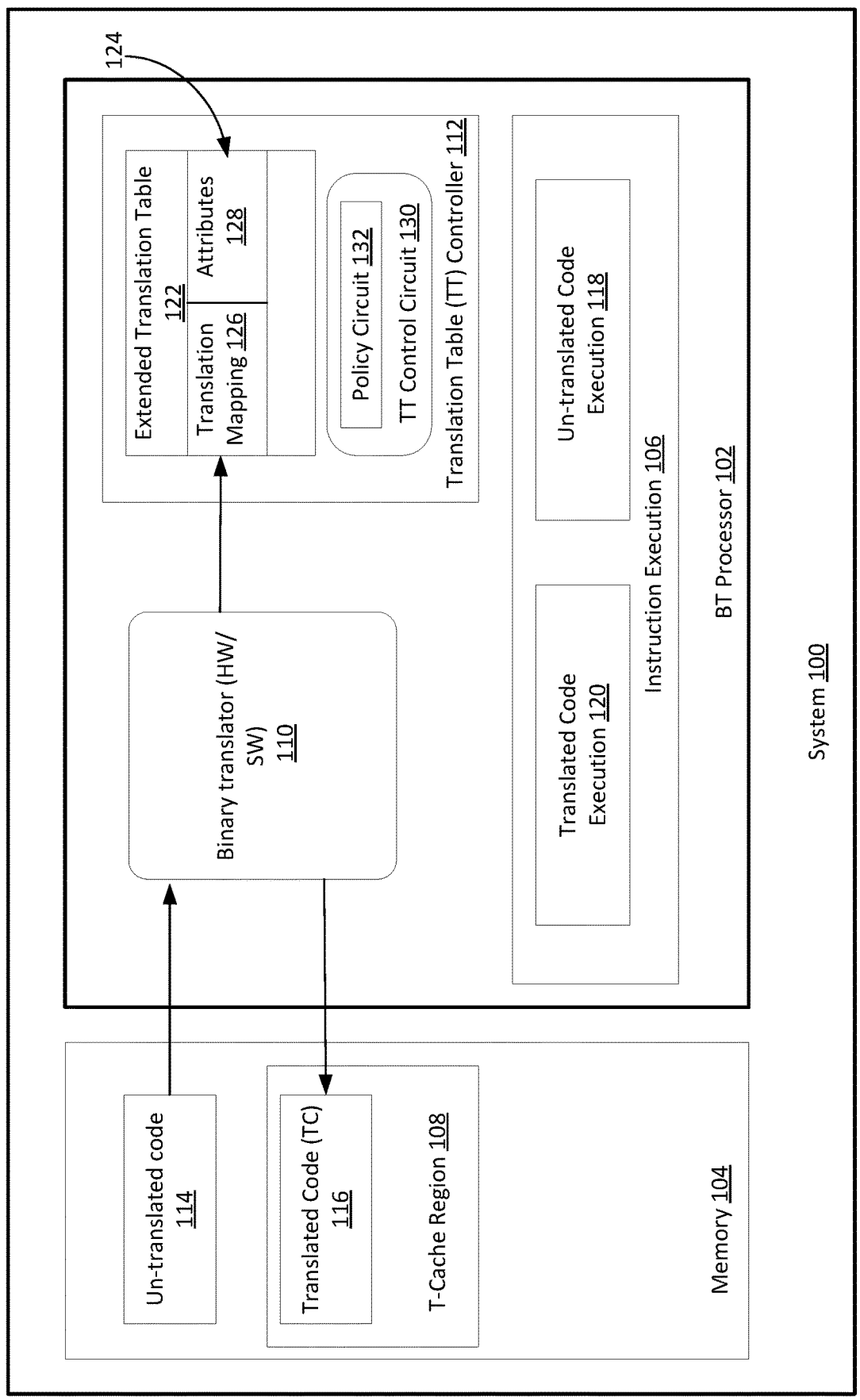
FIG. 1 illustrates a processing system according to an embodiment of the present disclosure.

The code specified according to the instruction set architecture (ISA) of the processor is often translated into a translated code specified according to the same or another ISA. The translated code can be executed with improved performance (e.g., speed) at the cost of resources spent on the translation. Certain types of multi-core processors may include a binary translator that converts a code specified according to the instruction set architecture (ISA) of the processor to a functionality-equivalent version of the code (translated code) specified according to the same or another ISA. The code translation may include code optimization to the same ISA (e.g., to emulate a complex instruction using a set of simple instructions or to remove redundant instructions) or to another ISA. The translated code may have been optimized with certain performance advantages such as, for example, the improvement of the execution speed. The optimization may include reordering of instructions.

The binary translator can be implemented using hardware circuitry or as a software component executed by the processor. In some implementations, the binary translator may use a translation table (TT), which is a hardware structure that an instruction fetch circuit can access with minimal delay. The translation table may contain entries to store the mappings between the original code and the translated code. In some implementations, an entry of the translation table may contain the mapping between a first memory address referencing the memory location for storing the original code and a second memory address referencing the memory location for storing the translated code. The translation table typically has a limited amount of storage space to store a pre-determined number of TT entries (e.g., 64 entries in a TT). Thus, the translation table may store only a subset of address mappings, while the full set of mappings may be stored in another larger but slower storage device (e.g., in a far memory)

The processor may include a control circuit (referred to as TT control circuit herein) to identify the translated code based on the mapping between the original code and the translated code. The TT control circuit may identify (e.g., by monitoring a program counter that stores the memory address of the instructions to be executed), an instruction ready to be executed, where the instruction is associated with a memory address. Responsive to identifying the instruction, the TT control circuit may first query the translation table to determine whether the translation table includes an entry associated with the memory address. Responsive to determining that there is such a mapping (referred to as a TT hit), the TT control circuit may cause the instruction execution circuit to retrieve, based on the mapping from the memory and execute the translated code. Responsive to determining that there is no such a mapping (referred to as a TT miss), the TT control circuit may perform one of two fallback options. As one option, the TT control circuit may assume that there is no translated code corresponding to the instruction to be executed, and allow the instruction execution circuit to execute the code without translation (the original code). Alternatively, responsive to a TT miss, the TT control circuit may look up the full set of mappings stored in the memory to determine whether there is translated code matching to the instruction to be executed in the full set. If the mapping to the translated code is found in the full set of mappings, an entry including the discovered mapping is added to the translation table, and the instruction execution circuit is to execute the translated code. Because of the slow lookup using the full set of mappings, it is also desirable to move the entry into the translation table prior to the TT miss.

Due to the limited size of the translation table, the addition of the new entry may force the eviction of an existing entry in the translation table because the translation table may have been filled up by existing entries. In some implementations, the TT control circuit selects the entry to evict based on a replacement policy (e.g., the least recently used (LRU) policy, which involves the eviction of the least recently used TT entry).

The performance of a binary translation based processor can be measured in terms of the ratio (referred to as the coverage) of executed instructions in translated code over those in un-translated code. Thus, the higher coverage value potentially indicates a higher performance of the binary translation based processor. Embodiments of the present disclosure extend the TT entries with one or more attribute values. Responsive to detecting a trigger event, a TT prefetcher circuit logic ("TT prefetcher") may use these attributes to prefetch TT entries from a translation manifest table (referred to as a manifest table) to the translation table, wherein the manifest table is a hardware/software co-designed translation cache index structure tailored to support efficient translation table refill operations on the basis of physical pages. The trigger event may occur due to a read miss associated with a memory page. The manifest table may contain TT entries that can be identified by their association with physical page numbers. Responsive to detecting the trigger event associated with the memory page identified by a physical page number, the TT prefetcher may prefetch these entries into the translation table in anticipation that they may be used for code translation, thus increasing the coverage (i.e., the TT hit rate) and reducing the need for searching the full set of mappings stored in the memory.

FIG. 1 illustrates a processing system 100 according to an embodiment of the present disclosure. As shown in FIG. 1, processing system 100 (e.g., a system-on-a-chip (SOC) or a motherboard of a computer system) may include a processor 102 and a memory device 104 communicatively coupled to processor 102. Processor 102 may be a hardware processing device such as, for example, a central processing unit (CPU) or a graphic processing unit (GPU) that includes one or more processing cores to execute software applications. Processing system 100 may further include a memory 104 for storing instructions and/or data associated with the execution of these instructions.

In one embodiment, processor 102 is a binary translator based processor that may execute code specified according to the ISA of the processor or may execute translated code (converted from the code) specified according to the same ISA or another ISA. As shown in FIG. 1, binary translation (BT) based processor 102 may include an instruction execution circuit 106, a binary translator 110, and a translation table (TT) controller 112 that are operably coupled to either other. Instruction execution circuit 106 can be a processing core including logic circuit to execute both translated code and the un-translated code. For example, instruction execution circuit 106 may include an un-translated code execution logic 118 for executing the un-translated code and a translated code execution logic 118 for executing the translated code.

Memory 104 may include a first region to store un-translated code 114 and a translation cache (or T-cache) region 108 to store translated code 116. Un-translated code 114 may include one or more instructions that can be referenced according to the memory address (e.g., physical memory addresses) at which an instruction is stored. In one embodiment, binary translator 110 may select, based on the need for optimization, regions of un-translated code 114 and convert the selected regions to translated code 116. Similarly, one or more instructions of the translated code 116 may be referenced according to the memory address of the instruction in the translated code 116. In one embodiment, translated code 116 is stored in a memory segment referred to as translation cache (TC), where the translated code 116 is identified by the entry point (e.g., the memory address of the code block at which the region starts). For example, the entry point of the un-translated code can be stored at a memory address of 0xBA8F. The code block starting from 0xBA8F may be translated and stored in TC at 0xDE79BA8F. From this point onward, the TT controller 112 may identify instructions whose memory address is in a program counter (not shown), indicating that these instructions are ready to be executed. The TT controller 112 may first determine, based on the translation table 122, whether the instructions starting from the memory address (e.g., 0xBA8F) have corresponding translated code. If the translated code is found (e.g., at 0xBA8F), the translated code execution unit 120 is to execute the translated code rather than the un-translated code.

Binary translator 110 can be a hardware-implemented logic circuit (or alternatively, a software component executing on processor 102) for converting regions of un-translated code 114 to translated code 116 stored in the TC. In some implementations, the conversion of regions of un-translated code to translated code is carried out (e.g., during code compilation) prior to loading the un-translated code 114 for execution. This is referred to as static binary translation. Embodiments of the present disclosure utilize dynamic binary translation, where the un-translated code is translated based on whether certain conditions are met during the execution process.

In one embodiment, instruction execution circuit 106 may execute, without translation, un-translated code 114. Responsive to determining that a certain region of the un-translated code 114 has been executed a number of times (e.g., over a threshold value), the region is determined to be "hot" and worthy of translation. A hardware profiling logic (a combination of performance counters and branch profiling logic) may record the number of times or the "hotness" of a region. BT processor 102 may invoke binary translator 110 to select and translate the "hot" region for code optimization. In one embodiment, a code region corresponds to a control flow graph (CFG) region of the code which forms the basic unit on which the binary translator 110 can operate. Responsive to completing the translation, binary translator 110 may store the translated code 116 in the translation cache and store a mapping between the un-translated code 114 and the translated code 116 in an entry of a the full set of mappings in far memory and optionally also in the translation table in the BT Processor 102. The mapping may be used in subsequent code execution to identify the translated code.

The code translation may be carried out using several rounds of optimizations from less optimized (thus requiring less translation time) to more optimized (thus requiring more translation time). In the first cut of translation, the seminally translated code is less optimized. After executing the seminally translated code for a pre-determined number of times, the seminally translated code may be further translated (with further optimization) as processor 102 may determine with a higher confidence level that the code region is worthy investing more resources for further optimization (or further translation). This is referred to as geared translation. Each round of translation is associated with a gear level. The higher gear translations are typically more optimized than lower gear translations.

During the execution of code, translation table (TT) controller 112 may include TT control circuit 130 to determine, based on a translation table, whether a region of un-translated code 114 has a corresponding region of translated code that can be executed by translation code execution unit 120. In some implementations, the translation table includes one or more entries to store the mappings between regions in un-translated code 114 and the corresponding regions of translated code 116 in the translation cache. For example, each entry may store the starting address of a code region in un-translated code 114 and the starting address of the corresponding region in translated code 108. Thus, TT control circuit 130 may look up the translated code as a response to identifying the un-translated code to be executed (e.g., in the program counter). Although these TT entries may provide the mappings between regions of un-translated code 114 and translated code 116, these entries do not provide hints as to which entry is most suitable for eviction when a new entry is to be added to a filled translation table. This may lead to eviction of more useful entries over less useful entries for translation, thereby resulting in processor performance loss (e.g., lower coverage). A TT entry is more useful if the translated code pointed to by this entry is more likely to be executed.

Embodiments of the present disclosure expand TT entries 124 with one or more attribute values encoding information about the code (both un-translated code and the translated code) and the status of the code execution. These attribute values may be derived from code translation by the binary translator or from execution of translated code 116. Thus, TT control circuit 130 may use these attribute values to select the least useful entries to evict from the translation table 122, thus improving the coverage of BT processor 102.

As shown in FIG. 1, TT controller 112 may include TT control circuit 130 which may determine whether there is a TT hit using an extended translation table (ETT) 122. Extended translation table 122 includes additional types of attribute values than a translation table. ETT 122 may be stored in a hardware structure associated with (either as part of or coupled to) TT controller 112. In one embodiment, ETT 122 may be an internal hardware feature of BT processor 102 that is not exposed to software applications. ETT 122 may include one or more entries 124 for storing the mapping between corresponding regions in un-translated code 114 and translated code 116. Additionally, each entry 124 in ETT 122 may be associated with an attribute field 128 for storing attribute values that can be used to improve the coverage of BT processor 102.

FIG. 2 illustrates an entry 200 of an extended translation table according to an embodiment of the present disclosure. As shown in FIG. 2, entry 200 may include a mapping field 202 and an attribute field 204. Mapping field 202 may include an un-translated code address sub-field 206 for storing the starting memory address of a region of un-translated code, and a translated code address sub-field 208 for storing the starting memory address of the region of the corresponding translated code. The value pair ("oxABCD" and "0xWXYZABCD") stored in the sub-fields 206, 208 forms the mapping between a region of un-translated code and a region of translated code.

Attribute field 204 of entry 200 may further include sub-fields for storing attribute values such as, for example, a hit count sub-field 210 for storing a hit count attribute value, a loop sub-field 220 for storing a loop attribute value, a dynamic execution count sub-field 222 for storing a dynamic execution count attribute value, a gear level sub-field 224 for storing a gear level attribute value, and a prefetch status sub-field 226 for storing a prefetch attribute value. Additionally, entry 200 may still be associated with a least-recently used (LRU) attribute value 228.

These attribute values may indicate different aspects of the code executing on BT processor 102. In one embodiment, TT control circuit 130 as shown in FIG. 1 may monitor the code execution by instruction execution circuit 106 and update these attribute values through the code execution. The hit count attribute value of sub-field 210 may indicate the number of times that the mapping 202 of the entry 200 is used for code translation (i.e., the number of TT hits). Entries with higher hit count may indicate that these entries are more useful for finding and executing translated code over entries with lower hit counts, and are thus prioritized for retention during TT entry eviction.

The loop attribute value stored in sub-field 220 may be a bit flag that, when set (e.g., to "1"), indicate that the region of the translated code associated with mapping 202 contains a loop (i.e., the execution of a sequence of instructions that is repeated iteratively until a condition is met). The entries associated with a loop may also be prioritized for retention during TT entry eviction over those not associated with a loop because code translation for a loop is likely to increase the coverage of number of translated instructions executed.

The dynamic execution count attribute value stored in sub-field 222 may indicate the ratio between the number of instructions in the code region over the number of conditional branches in the code region, where each branch in the code may include one or more instructions the execution of which depends on whether a condition is met. The dynamic execution count attribute value may reflect the effective size of the code region when the translated code is executed. For example, the dynamic execution count of the translated code region that contains two conditional blocks of instructions (each with 10 instructions) may have a smaller dynamic execution count than the code region that contains a single block of twenty instructions with no condition. The reason is that, when the translated code of the first scenario (two conditional blocks of 10 instructions) is executed, it is certain that a branch termination would lead to outside of the translated code, thus reducing the effective size of the translated code region to only 10 instructions. The second scenario of a single block of 20 instructions would guarantee 20 instructions being executed as translated code. Entries with higher dynamic execution count attribute value may be prioritized for retention during TT entry eviction over those with lower dynamic execution count attribute value.

The gear level attribute value stored in sub-field 224 may represent the number of rounds of optimizations performed in a tiered code translation system. Entries associated with a higher gear level (more optimization rounds performed) may be prioritized over entries with a lower gear level for retention during TT entry eviction because it is assumed that more rounds of optimization generate more efficient code.

The prefetch attribute value stored in sub-field 226 may be a bit flag to indicate whether the entry is one that has been prefetched into the translation table from the full set of translation mappings stored in the memory (or a higher level cache such as the last level cache (LLC)). The prefetch attribute value, when set (e.g., to "1"), may indicate that the entry has been prefetched from the memory to the translation table before it is being used to increase the coverage. For example, the prefetching may take place based on occurrence of certain trigger events (e.g., instruction translation lookaside buffer (TLB) miss event). The entry is prefetched from the full set of mappings stored in the far memory to the translation table under the assumption that it might be used sometime in the near future. But the new entry being inserted into the translation table will be used immediately. Hence entries associated with the prefetch attribute value set are prioritized for eviction from the TT over entries with the prefetch attribute value not set.

The LRU attribute value 228 may indicate the time that the entry 200 is last used by TT control circuit 130 to look up code translation. The LRU attribute value 228 is recorded by the hardware translation cache each time the entry is accessed by TT control circuit 130. Thus, LRU attribute value 228 is not written by TT control circuit 130 based on monitoring the code execution. The entries associated with a lower LRU attribute value 228 may be prioritized for retention during TT entry eviction.

Figure 3:
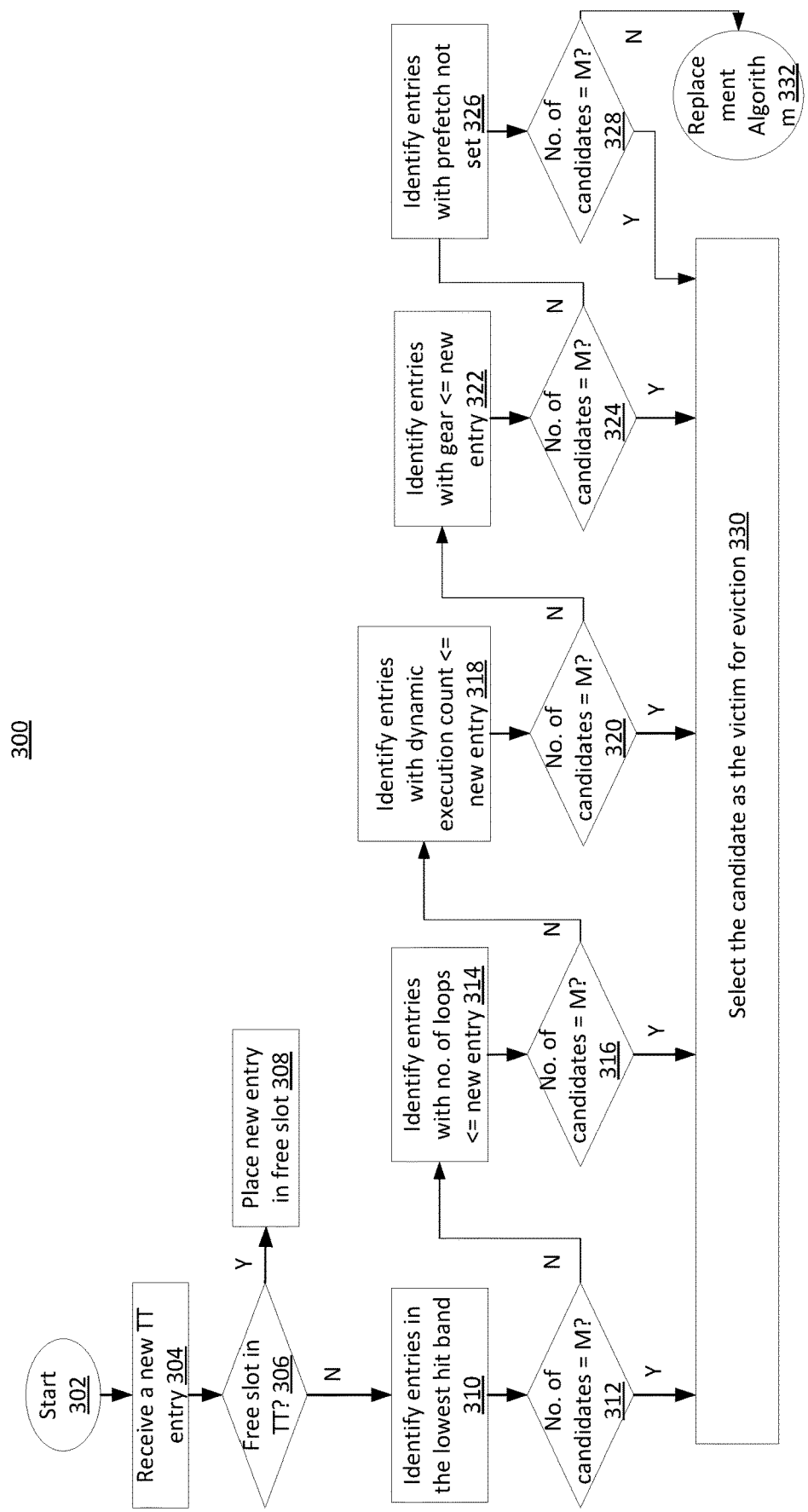
FIG. 3 illustrates an exemplary replacement policy for selecting victim entries based on associated attribute values according to an embodiment of the present disclosure.

Referring to FIG. 1, in one embodiment, TT control circuit 130 may include policy circuit 132 implementing a replacement policy based on attribute values stored in attribute field 128. The replacement policy may include rules using these attribute values for selecting a victim entry for eviction. For example, the rules can be implemented as a decision logic (implemented in software or hardware) relating to the retention of entries associated with a loop over one without a loop. FIG. 3 illustrates an exemplary replacement policy 300 for selecting victim entries based on associated attribute values according to an embodiment of the present disclosure.

At 302, the TT control circuit 130 may start the policy circuit 132. At 304, policy circuit 132 may a request to add a new entry to the extended translation table 122. Responsive to receiving the request, at 306, policy circuit 132 may determine whether there is a free slot in the extended translation table to accommodate the new entry. At 308, responsive to determining that there is a free slot in the extended translation table 122, TT control circuit 130 may place the new entry in the free slot.

Responsive to determining that there is no free slot in the extended translation table at 306, policy circuit 132 may need to identify a victim entry in the extended translation table 122 as the candidate to evict from the translation table 122. In one embodiment, the victim is selected based on the attribute values associated with each entry.

In one embodiment, policy circuit 132 may first try to identify the victim entry based on the hit count attribute values associated with entries. Instead of operating on each hit count value, the hit count values are grouped into several bands. Each band covers a hit count value range. Thus, each band may be associated with several entries that are associated with hit count attribute values within the band. At 310, policy circuit 132 may identify entries associated with the lowest hit count value band as potential victim candidates. At 312, policy circuit 132 may determine whether the number of potential candidates is a predetermined value M (e.g., M=1). Responsive to determining that the number of potential victim candidates is one, at 330, policy circuit 132 may select the sole candidate as the victim for eviction.

Responsive to determining that that the number of potential victim candidates is not one (either zero or more than one), policy circuit 132 may compare the loop indicator associated with the code region specified by the new entry with loop attribute values in entries of the extended translation table 122. At 314, policy circuit 132 may identify those extended translation table entries the loop attribute values of which are no more than the loop attribute value of the new entry (i.e., if the new entry has no loops, the identified extended TT entries have no loops; if the new entry has loops, the identified extended TT entries can have or have no loops). At 316, policy circuit 132 may determine whether the number of identified extended translation table entries is a predetermined value M (e.g., M=1). Responsive to determining that the number is one, at 330, policy circuit 132 may select the sole candidate as the victim entry for eviction.

Responsive to determining that the number of identified extended translation table entries is not one, policy circuit 132 may determine the dynamic execution count attribute value of the code region associated with the new entry and compare the dynamic execution count value of the new entry with the dynamic execution count attribute values stored in the extended translation table entries. At 318, policy circuit 132 may identify, as potential eviction victim candidates, extended translation table entries with the dynamic execution count attribute values that are no more than the dynamic execution count value of the new entry. At 320, policy circuit 132 may determine whether the number of potential eviction victim candidates is a predetermined value M (e.g., M=1). Responsive to determining that the number of potential eviction victim candidates is one, at 330, policy circuit 132 may select the sole candidate as the victim entry for eviction.

Responsive to determining that the number of potential eviction victim candidates is not one, policy circuit 132 may determine the gear level of the code region associated with the new entry. AT 322, policy circuit 132 may identify, as potential eviction victim candidates, extended translation table entries with the gear level attribute values that are no more than the gear level of the new entry. At 324, policy circuit 132 may determine whether the number of potential eviction victim candidates is a predetermined value M (e.g., M=1). Responsive to determining that the number of potential eviction victim candidates is one, at 330, policy circuit 132 may select the sole candidate as the victim entry for eviction.

Responsive to determining that the number of potential eviction victim candidates is not one, at 326, policy circuit 132 may identify, as potential eviction victim candidates, the extended translation table entries whose the prefetch attribute values are not set (i.e., those non-prefetch entries). At 328, policy circuit 132 may determine whether the number of potential eviction victim candidates is a predetermined value M (e.g., M=1). Responsive to determining that the number of potential eviction victim candidates is one, at 330, policy circuit 132 may select the sole candidate as the victim entry for eviction. Responsive to determining that the number of potential eviction victim candidates is not one, at 322, the policy circuit 132 may apply a replacement algorithm (e.g. the least-recently used (LRU) policy or random replacement policy etc.) on the potential eviction victim candidates to determine the victim entry. If the number of potential eviction victim candidates is zero, the replacement algorithm is used as default on all of the entries in the extended translation table 122.

Figure 4:
FIG. 4 is a block diagram of a method to update an extended translation table entry according to an embodiment of the present disclosure.
Figure 4:

FIG. 4 is a block diagram of a method 400 to update an extended translation table entry according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by TT controller 112, as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, the TT controller of a binary-translation based processor, at 402, may monitor execution of a second code translated from a first code.

At 404, the TT controller may update, based on a performance metric of the execution, an attribute value of the TT entry. The attribute value may include at least of a TT hit count attribute value representing a number of times that the mapping has been used to translate the first code to the second code, a loop attribute value indicating whether there are instruction loops in the first code, a dynamic execution count attribute value representing a number of instructions in the first code divided by a number of conditional branches in the first code, a gear level attribute value representing a number of rounds of optimization in translating the first code to the second code, or a prefetch attribute value indicating whether the entry is prefetched from a full list of mappings stored in the memory.

Figures 5A, 5B:
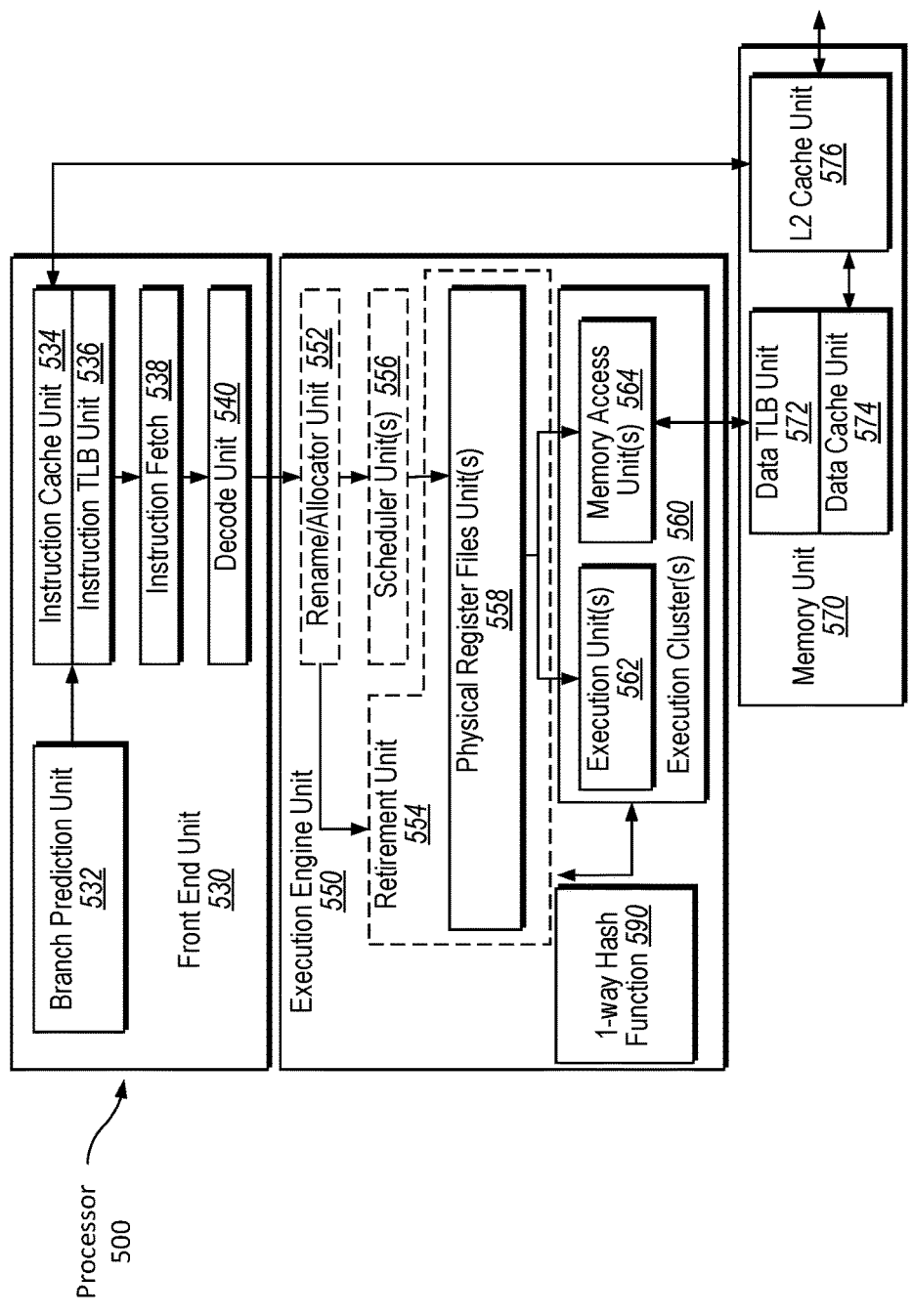
FIG. 5A is a block diagram illustrating a micro-architecture for a processor including heterogeneous core in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor 500 as a pipeline includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
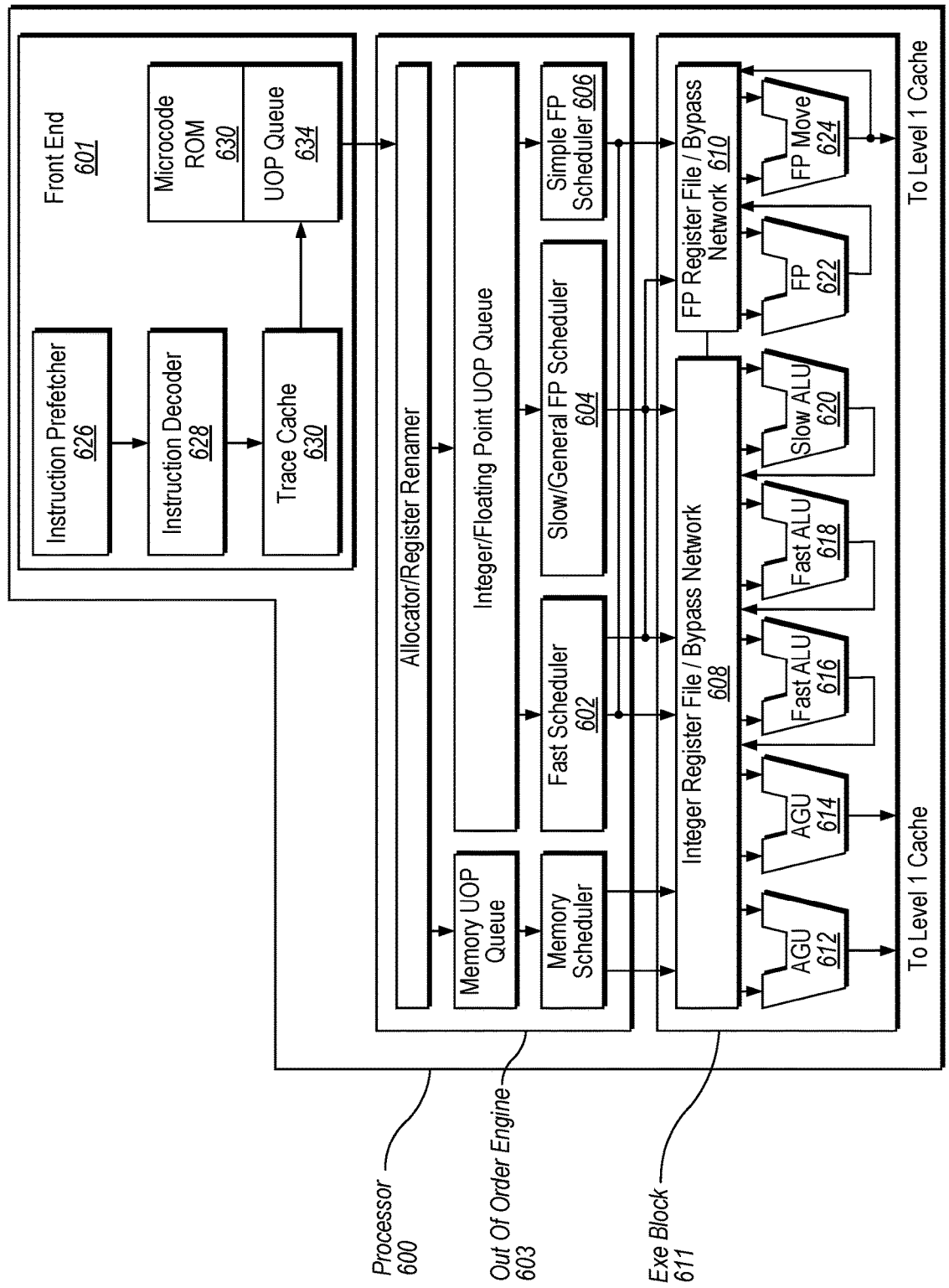
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other.

For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
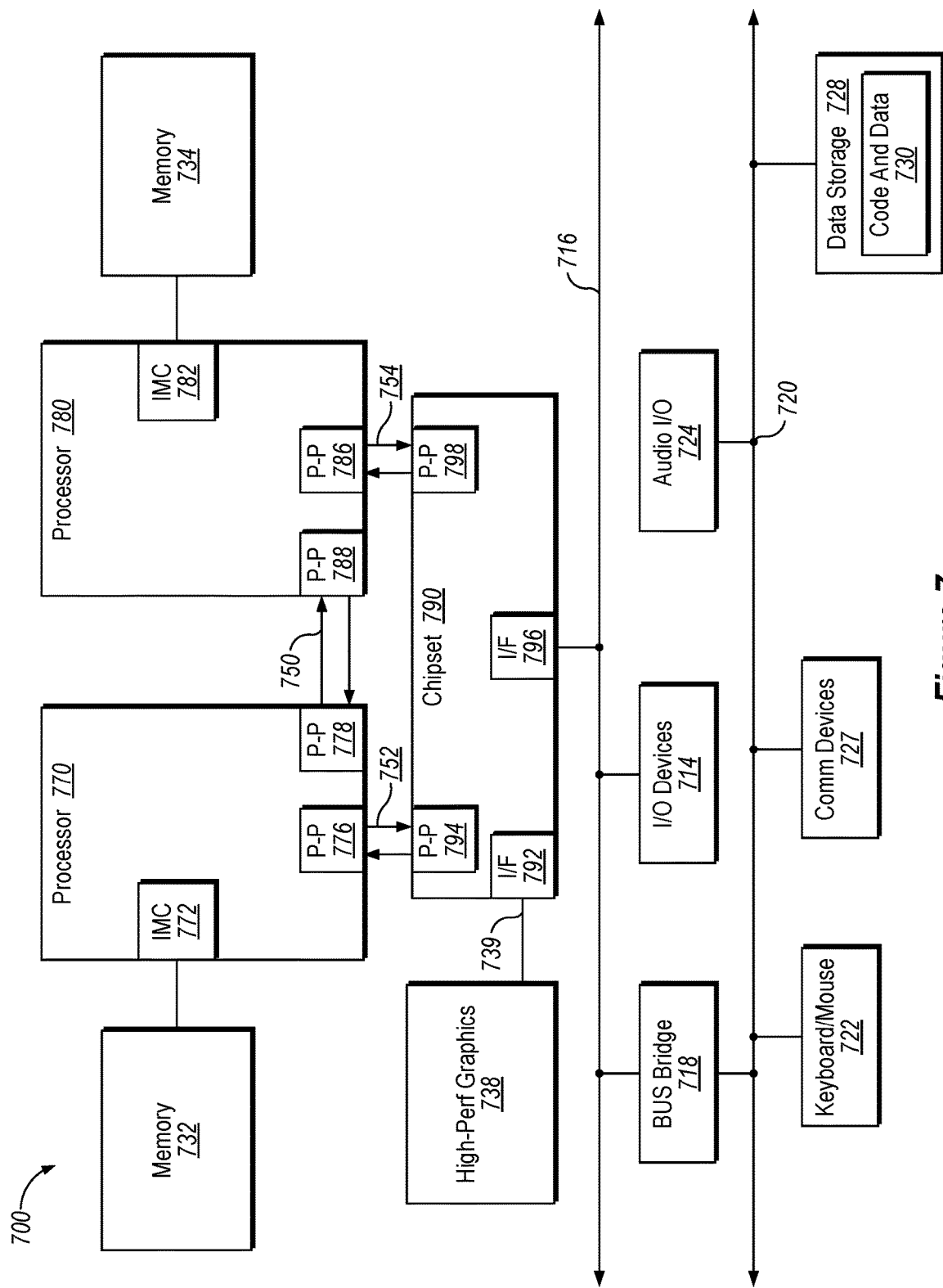
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
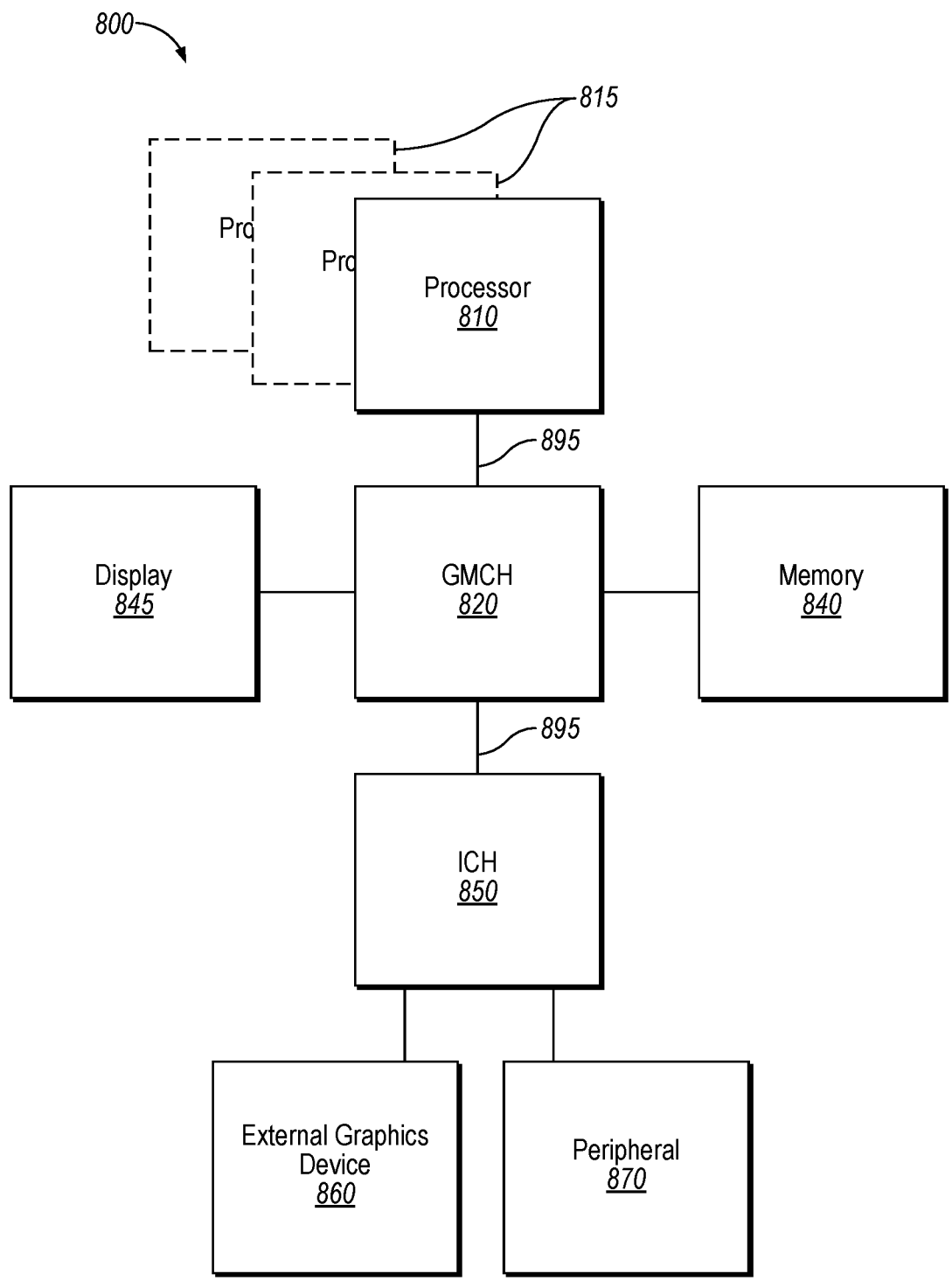
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
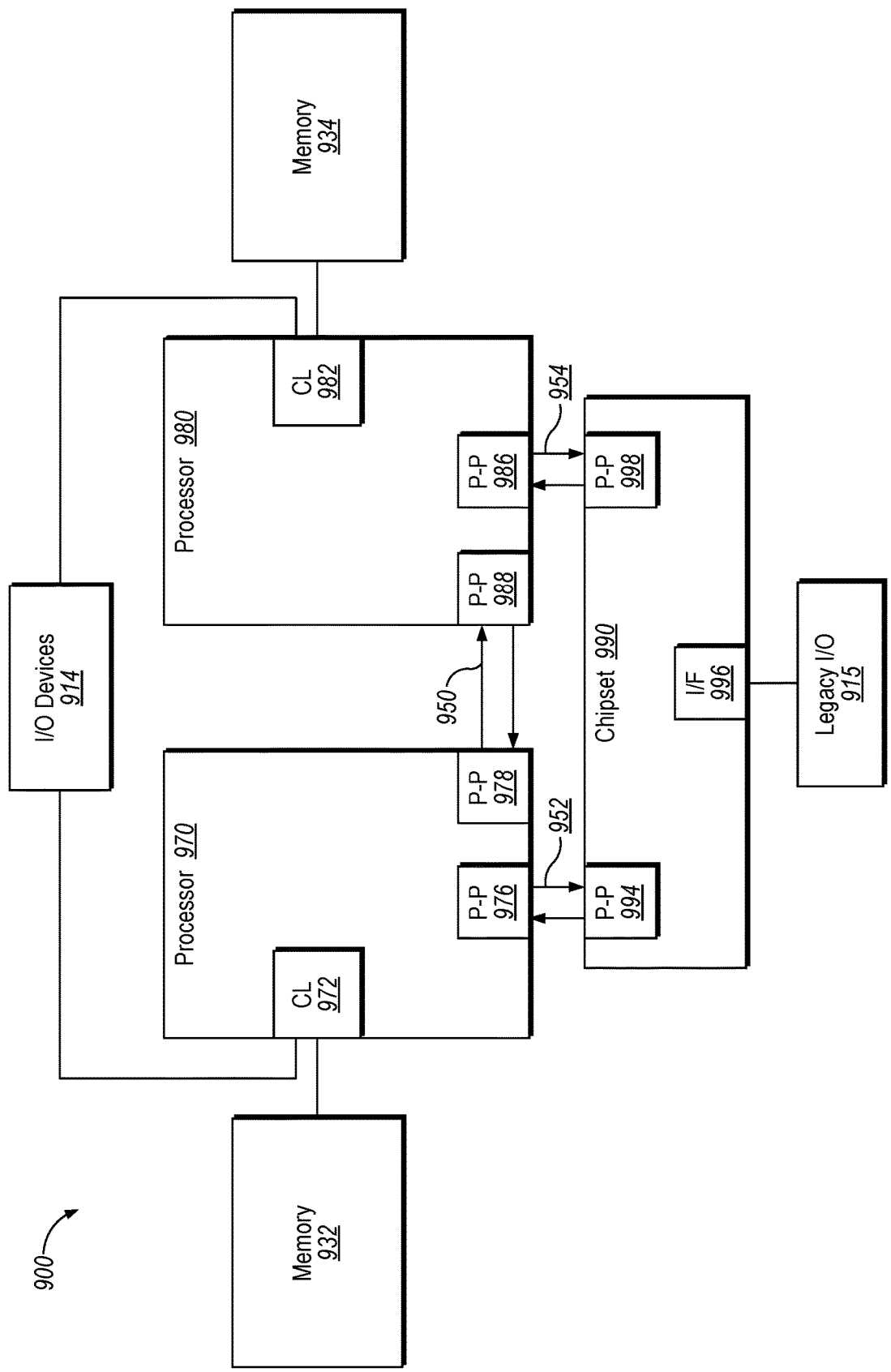
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
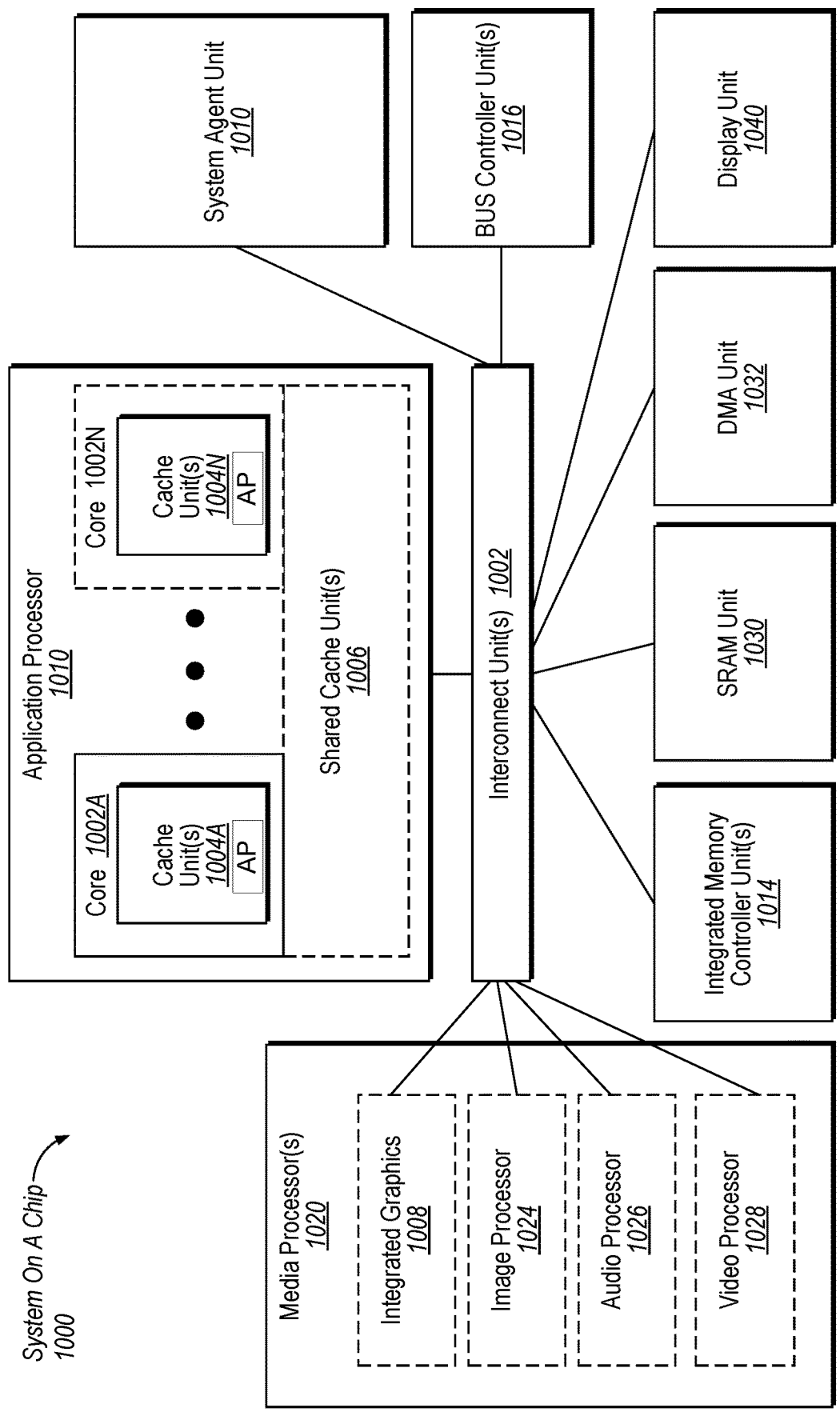
FIG. 10 is a block diagram of a System-on-a-Chip (SoC) in accordance with an embodiment of the present disclosure.

Embodiments may be implemented in many different system types. FIG. 10 is a block diagram of a SoC 1000 in accordance with an embodiment of the present disclosure. Dashed lined boxes are optional features on more advanced SoCs. In some implementations, SoC 1000 as shown in FIG. 10 includes features of the SoC 100 as shown in FIG. 1. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
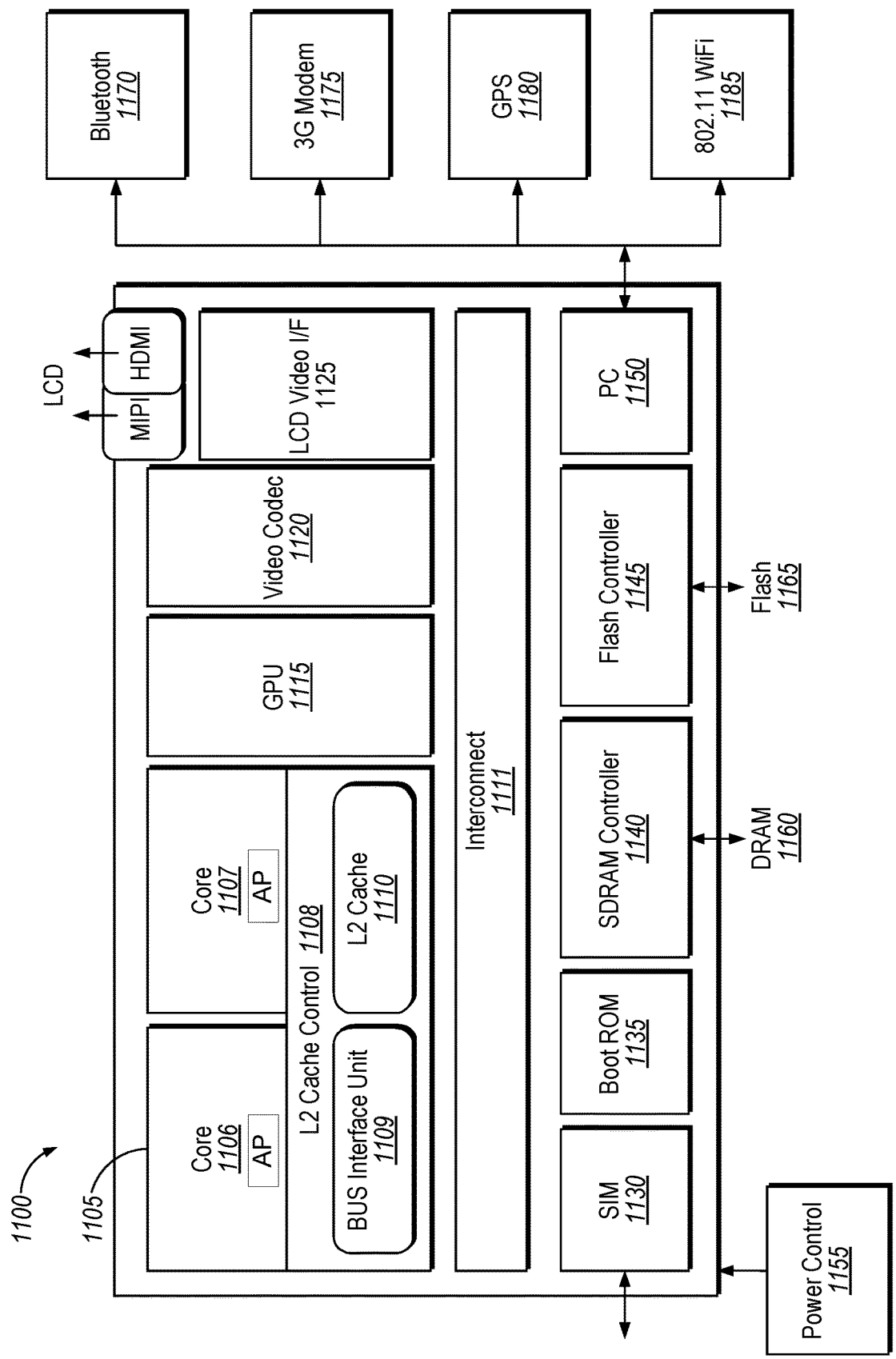
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
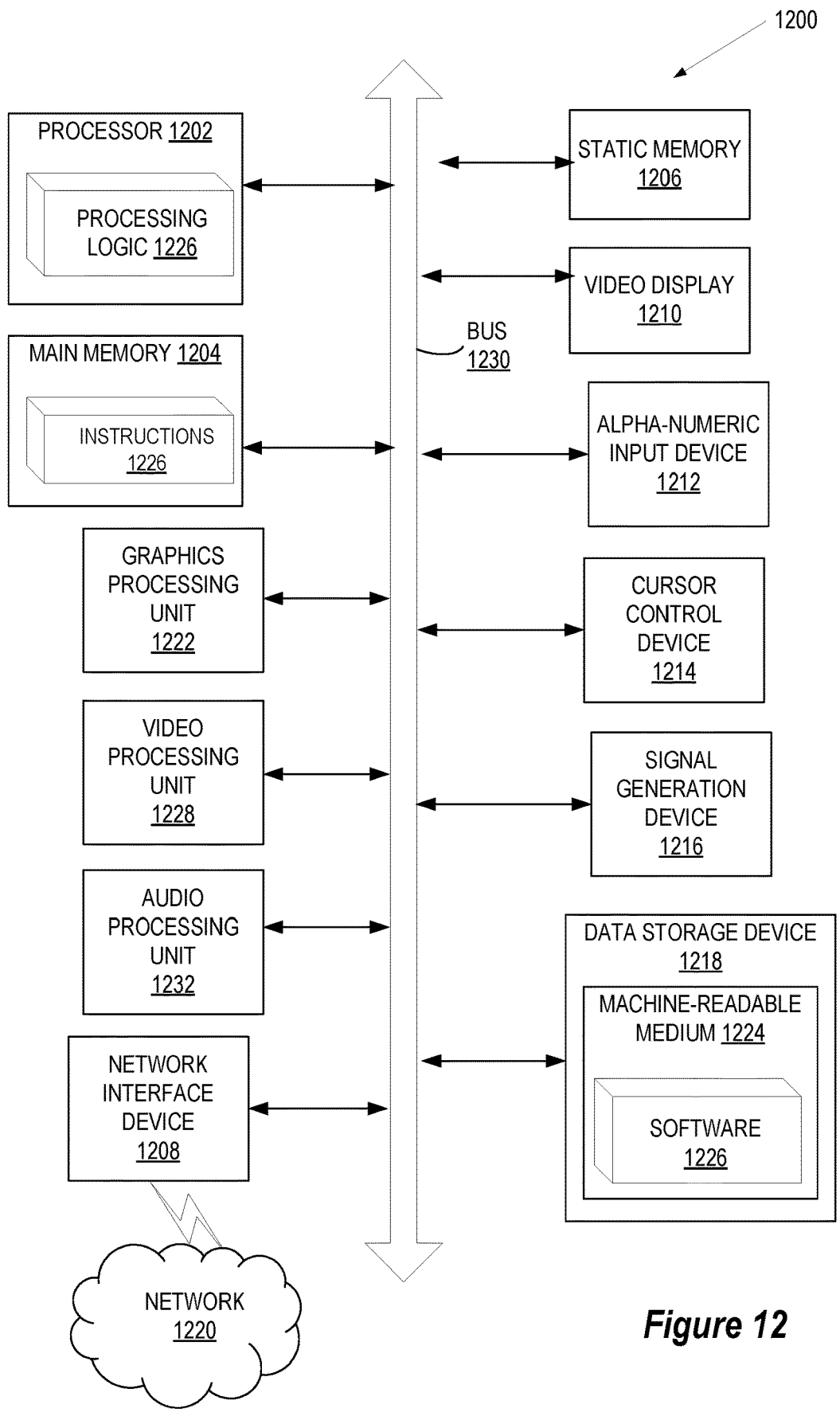
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. For example, processing logic 1226 may perform operations as described in FIG. 4. In one embodiment, processing device 1202 is the same as processor architecture 102 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor comprising an instruction execution circuit to execute a second code stored at a second address of a memory, wherein the second code is translated from a first code stored at a first address of the memory and a translation table (TT) controller coupled to a TT to store a TT entry comprising a mapping between the first address and the second address and an attribute field comprising an attribute value associated with execution of the second code, wherein the TT controller is to monitor execution of the second code by the instruction execution circuit and update, based on a performance metric of the execution, the attribute value of the TT entry.

In Example 2, the subject matter of Example 1 can further include a binary translator circuit to translate the first code to the second code, store the second code at the second address of the memory, and generate the TT entry stored in the translation table.

In Example 3, the subject matter of Example 1 can further provide that the first code is specified according to a first instruction set architecture, and wherein the second code is specified according to one of the first instruction set architecture or a second instruction set architecture.

In Example 4, the subject matter of Example 1 can further provide that the TT controller is further to identify, using the instruction execution circuit, the first code to be executed, search the translation table to determine whether the TT entry comprises the mapping between the first code and the second code, and responsive to determining that TT entry comprises the mapping, cause the instruction execution circuit to execute the second code.

In Example 5, the subject matter of Example 1 can further provide that the at least one attribute value comprises at least one of a TT hit count attribute value representing a number of times that the mapping has been used to translate the first code to the second code, a loop attribute value indicating whether there are instruction loops in the first code, a dynamic execution count attribute value representing a number of instructions in the first code divided by a number of conditional branches in the first code, a gear level attribute value representing a number of rounds of optimization in translating the first code to the second code, or a prefetch attribute value indicating whether the entry is prefetched from a full list of mappings stored in the memory.

In Example 6, the subject matter of Example 1 can further provide that the TT controller further comprises a replacement policy circuit to select, based on the at least one attribute value, an eviction victim entry from a plurality of entries in the translation table, and evict the eviction victim entry from the translation table.

In Example 7, the subject matter of any of Examples 1 and 6 can further provide that the replacement policy circuit to designate, based on TT hit count attribute values associated with the plurality of entries, a first entry in the translation table as the eviction victim entry.

In Example 8, the subject matter of any of Examples 1 and 6 can further provide that the replacement policy circuit to determine, based on loop attribute values associated with the plurality of entries, a first entry in the translation table as the eviction victim entry.

In Example 9, the subject matter of any of Examples 1 and 6 can further provide that the replacement policy circuit to determine, based on dynamic execution count attribute values associated with the plurality of entries, a first entry in the translation table as the eviction victim entry.

In Example 10, the subject matter of any of Examples 1 and 6 can further provide that the replacement policy circuit to determine, based on gear level attribute values associated with the plurality of entries, a first entry in the translation table as the eviction victim entry.

In Example 11, the subject matter of any of Examples 1 and 6 can further provide that the replacement policy circuit is to determine, based on prefetch attribute values associated with the plurality of entries, a first entry in the translation table as the eviction victim entry.

Example 12 is a system comprising a memory to store a first code stored at a first address of a memory and a second code, translated from the first code, at a second address, a processor comprising an instruction execution circuit to execute the second code, and a translation table (TT) controller coupled to a translation table to store a TT entry comprising a mapping between the first address and the second address, and an attribute field comprising an attribute value associated with execution of the second code, wherein the TT controller is to monitor execution of the second code by the instruction execution circuit, and update, based on a performance metric of the execution, the attribute value of the TT entry.

In Example 13, the subject matter of Example 12 can further provide that the processor further comprises a binary translator to translate the first code to the second code, store the second code at the second address of the memory, and generate the TT entry stored in the translation table.

In Example 14, the subject matter of Example 12 can further provide that the first code is specified according to a first instruction set architecture, and wherein the second code is specified according to one of the first instruction set architecture or a second instruction set architecture.

In Example 15, the subject matter of Example 12 can further provide that the TT controller is further to identify, using the instruction execution circuit, the first code to be executed, search the translation table to determine whether the TT entry comprises the mapping between the first code and the second code, and responsive to determining that TT entry comprises the mapping, cause the instruction execution circuit to execute the second code.

In Example 16, the subject matter of Example 12 can further provide that the at least one attribute value comprises at least one of a TT hit count attribute value representing a number of times that the mapping has been used to translate the first code to the second code, a loop attribute value indicating whether there are instruction loops in the first code, a dynamic execution count attribute value representing a number of instructions in the first code divided by a number of conditional branches in the first code, a gear level attribute value representing a number of rounds of optimization in translating the first code to the second code, or a prefetch attribute value indicating whether the entry is prefetched from a full list of mappings stored in the memory.

In Example 17, the subject matter of Example 12 can further provide that the TT controller further comprises a replacement policy circuit to select, based on the at least one attribute value, an eviction victim entry from a plurality of entries in the translation table, and evict the eviction victim entry from the translation table.

In Example 18, the subject matter of any of Examples 12 and 17 can further provide that the replacement policy circuit to designate, based on at least one of TT hit count attribute values, loop attribute values, dynamic execution count attribute values, gear level attribute values, prefetch attribute values associated with the plurality of entries, a first entry as the eviction victim entry.

Example 19 is a method comprising monitoring, by a translation table (TT) controller associated with a binary translation based (BT) processor, execution of a second code translated from a first code, and updating, based on a performance metric of the execution, an attribute value of the TT entry, the attribute value comprising at least one of a TT hit count attribute value representing a number of times that the mapping has been used to translate the first code to the second code, a loop attribute value indicating whether there are instruction loops in the first code, a dynamic execution count attribute value representing a number of instructions in the first code divided by a number of conditional branches in the first code, a gear level attribute value representing a number of rounds of optimization in translating the first code to the second code, or a prefetch attribute value indicating whether the entry is prefetched from a full list of mappings stored in the memory.

In Example 20, the subject matter of Example 19 can further include selecting, based on the attribute value, an eviction victim entry from a plurality of entries in the translation table, and evicting the eviction victim entry from the translation table.

Example 21 is an apparatus comprising: means for performing the method of any of Examples 19 to 20.

Example 22 is a machine-readable non-transitory medium having stored thereon program code that, when executed, perform operations comprising monitoring, by a translation table (TT) controller associated with a binary translation based (BT) processor, execution of a second code translated from a first code, and updating, based on a performance metric of the execution, an attribute value of the TT entry, the attribute value comprising at least one of a TT hit count attribute value representing a number of times that the mapping has been used to translate the first code to the second code, a loop attribute value indicating whether there are instruction loops in the first code, a dynamic execution count attribute value representing a number of instructions in the first code divided by a number of conditional branches in the first code, a gear level attribute value representing a number of rounds of optimization in translating the first code to the second code, or a prefetch attribute value indicating whether the entry is prefetched from a full list of mappings stored in the memory.

In Example 23, the subject matter of Example 22 can further provide that the operations further comprise selecting, based on the attribute value, an eviction victim entry from a plurality of entries in the translation table, and evicting the eviction victim entry from the translation table.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   monitoring, by a translation table (TT) controller associated with a binary translation based (BT) processor, execution of a second code translated from a first code; and
   updating, based on a performance metric of the execution, an attribute value of a TT entry, the attribute value comprising at least one of:
   a TT hit count attribute value representing a number of times that a mapping has been used to translate the first code to the second code;
   a loop attribute value indicating whether there are instruction loops in the first code;
   a dynamic execution count attribute value representing a number of instructions in the first code divided by a number of conditional branches in the first code;
   a gear level attribute value representing a number of rounds of optimization in translating the first code to the second code; or
   a prefetch attribute value indicating whether the TT entry is prefetched from a full list of mappings stored in memory.

2. The method of claim 1, further comprising:
   selecting, based on the attribute value, an eviction victim entry from a plurality of entries in the translation table; and
   evicting the eviction victim entry from the translation table.

3. A system comprising:
   a memory to store a first code at a first address and a second code, translated from the first code, at a second address;
   a processor comprising an instruction execution circuit to execute the second code; and
   a translation table (TT) controller coupled to a translation table to store a TT entry comprising:
   a mapping between the first address and the second address; and an attribute field comprising an attribute value associated with execution of the second code, wherein the attribute value comprises at least one of:
a TT hit count attribute value representing a number of times that the mapping has been used to translate the first code to the second code;
a loop attribute value indicating whether there are instruction loops in the first code;
a dynamic execution count attribute value representing a number of instructions in the first code divided by a number of conditional branches in the first code;
a gear level attribute value representing a number of rounds of optimization in translating the first code to the second code; or
a prefetch attribute value indicating whether the TT entry is prefetched from a full list of mappings stored in the memory; and
the TT controller is to:
monitor an execution of the second code by the instruction execution circuit; and
update, based on a performance metric of the execution, the attribute value of the TT entry.

4. The system of claim 3, wherein the processor further comprises a binary translator to:
translate the first code to the second code;
store the second code at the second address of the memory; and
generate the TT entry stored in the translation table.

5. The system of claim 3, wherein the first code is specified according to a first instruction set architecture, and wherein the second code is specified according to one of the first instruction set architecture or a second instruction set architecture.

6. The system of claim 3, wherein the TT controller is further to:
identify, using the instruction execution circuit, the first code to be executed;
search the translation table to determine whether the TT entry comprises the mapping between the first code and the second code; and
responsive to determining that TT entry comprises the mapping, cause the instruction execution circuit to execute the second code.

7. The system of claim 3, wherein the TT controller further comprises a replacement policy circuit to:
select, based on the attribute value, an eviction victim entry from a plurality of entries in the translation table; and
evict the eviction victim entry from the translation table.

8. The system of claim 7, wherein the replacement policy circuit to designate, based on at least one of TT hit count attribute values, loop attribute values, dynamic execution count attribute values, gear level attribute values, prefetch attribute values associated with the plurality of entries, a first entry as the eviction victim entry.

9. A processor comprising:
an instruction execution circuit to execute a second code stored at a second address of a memory, wherein the second code is translated from a first code stored at a first address of the memory; and
a translation table (TT) controller coupled to a translation table to store a TT entry comprising:
a mapping between the first address and the second address; and
an attribute field comprising an attribute value associated with execution of the second code, wherein the attribute value comprises at least one of:
a TT hit count attribute value representing a number of times that the mapping has been used to translate the first code to the second code;
a loop attribute value indicating whether there are instruction loops in the first code;
a dynamic execution count attribute value representing a number of instructions in the first code divided by a number of conditional branches in the first code;
a gear level attribute value representing a number of rounds of optimization in translating the first code to the second code; or
a prefetch attribute value indicating whether the TT entry is prefetched from a full list of mappings stored in the memory; and
the TT controller is to:
monitor an execution of the second code by the instruction execution circuit; and
update, based on a performance metric of the execution, the attribute value of the TT entry.

10. The processor of claim 9, further comprising a binary translator circuit to:
translate the first code to the second code;
store the second code at the second address of the memory; and
generate the TT entry stored in the translation table.

11. The processor of claim 9, wherein the first code is specified according to a first instruction set architecture, and wherein the second code is specified according to one of the first instruction set architecture or a second instruction set architecture.

12. The processor of claim 9, wherein the TT controller is further to:
identify, using the instruction execution circuit, the first code to be executed;
search the translation table to determine whether the TT entry comprises the mapping between the first code and the second code; and
responsive to determining that TT entry comprises the mapping, cause the instruction execution circuit to execute the second code.

13. The processor of claim 9, wherein the TT controller further comprises a replacement policy circuit to:
select, based on the attribute value, an eviction victim entry from a plurality of entries in the translation table; and
evict the eviction victim entry from the translation table.

14. The processor of claim 13, wherein the replacement policy circuit to designate, based on TT hit count attribute values associated with the plurality of entries, a first entry in the translation table as the eviction victim entry.

15. The processor of claim 13, wherein the replacement policy circuit to determine, based on loop attribute values associated with the plurality of entries, a first entry in the translation table as the eviction victim entry.

16. The processor of claim 13, wherein the replacement policy circuit to determine, based on dynamic execution count attribute values associated with the plurality of entries, a first entry in the translation table as the eviction victim entry.

17. The processor of claim 13, wherein the replacement policy circuit to determine, based on gear level attribute values associated with the plurality of entries, a first entry in the translation table as the eviction victim entry.

18. The processor of claim 13, wherein the replacement policy circuit is to determine, based on prefetch attribute values associated with the plurality of entries, a first entry in the translation table as the eviction victim entry.

* * * * *